(12) United States Patent
Henderson et al.

(10) Patent No.: US 10,498,193 B2
(45) Date of Patent: Dec. 3, 2019

(54) DRIVEN GEAR DIAGNOSTIC SYSTEM AND METHOD

(71) Applicants: Mark Henderson, La Verne, CA (US); Adam Plesniak, Huntington beach, CA (US); Kyle Zech, Phoenix, AZ (US); Kenneth D Miller, Statesville, NC (US)

(72) Inventors: Mark Henderson, La Verne, CA (US); Adam Plesniak, Huntington beach, CA (US); Kyle Zech, Phoenix, AZ (US); Kenneth D Miller, Statesville, NC (US)

(73) Assignee: KINEMATICS, LLC., Phoenix, AZ (US)

( * ) Notice: Subject to any disclaimer, the term of this patent is extended or adjusted under 35 U.S.C. 154(b) by 78 days.

(21) Appl. No.: 15/834,913

(22) Filed: Dec. 7, 2017

(65) Prior Publication Data

US 2018/0175699 A1    Jun. 21, 2018

Related U.S. Application Data

(60) Provisional application No. 62/434,822, filed on Dec. 15, 2016.

(51) Int. Cl.
*F16H 61/12*    (2010.01)
*H02K 7/116*    (2006.01)
(Continued)

(52) U.S. Cl.
CPC .............. *H02K 7/116* (2013.01); *F16H 1/16* (2013.01); *F16H 19/02* (2013.01); *F16H 57/039* (2013.01);
(Continued)

(58) Field of Classification Search
CPC .... F16H 2061/1208; F16H 1/16; F16H 61/12; F16H 57/039; F16H 2057/012; H02K 7/116; G01M 13/021
(Continued)

(56) References Cited

U.S. PATENT DOCUMENTS 5,021,764 A * 6/1991 Mabee ................. B60R 25/003
                                                180/337
6,507,789 B1 * 1/2003 Reddy ................. G01M 13/021
                                                702/34

(Continued)

*Primary Examiner* — Roger L Pang
(74) *Attorney, Agent, or Firm* — Parsons & Goltry; Robert Parsons; Michael Goltry

(57) ABSTRACT

A gear assembly diagnostic system includes an electric motor attached to a gear assembly to be diagnosed, a motor controller coupled to the electric motor to control electric current applied to the electric motor, a test controller coupled to the motor controller to provide commands to the motor controller, and electrical current determining apparatus coupled to provide a measurement of current flow through the electric motor. A programmable data acquisition device is coupled to the electrical current determining apparatus and is programmable to determine current flow through the electrical motor at a predetermined frequency. Data storage is coupled to the data acquisition device for receiving and storing current flow determinations from the data acquisition device and a computer is coupled to, and may include, the data storage. The computer includes software designed to calculate one or more characteristics of the gear assembly to be diagnosed from the current flow determinations.

22 Claims, 3 Drawing Sheets

(51) Int. Cl.
*F16H 57/039* (2012.01)
*F16H 1/16* (2006.01)
*F16H 19/02* (2006.01)
*G01M 13/021* (2019.01)
*F16H 57/01* (2012.01)

(52) U.S. Cl.
CPC .......... *F16H 61/12* (2013.01); *G01M 13/021* (2013.01); *F16H 2057/012* (2013.01); *F16H 2061/1208* (2013.01); *Y02E 10/725* (2013.01)

(58) Field of Classification Search
USPC ...................................................... 701/58, 59
See application file for complete search history.

(56) References Cited

U.S. PATENT DOCUMENTS

| | | | |
|---|---|---|---|
| 9,580,934 B2* | 2/2017 | Baty | E05B 47/0012 |
| 9,863,845 B2* | 1/2018 | Mesia | G01H 1/006 |
| 2008/0223093 A1* | 9/2008 | Amir | E05B 47/0012 |
| | | | 70/283.1 |

* cited by examiner

DRIVEN GEAR DIAGNOSTIC SYSTEM AND METHOD

CROSS-REFERENCE TO RELATED APPLICATION

This application claims the benefit of U.S. Provisional Patent Application No. 62/434,822, filed 15 Dec. 2016.

FIELD OF THE INVENTION

This invention relates to driven gear assemblies.

More particularly, the present invention relates to apparatus and methods for the diagnosis of driven gears.

BACKGROUND OF THE INVENTION

Because some tolerance is always necessary in the manufacture of motor driven gear assemblies, there is always some play or backlash in the movement. "Backlash" can be generally defined as movement of a driving gear, for example a worm gear, before it engages and moves driven gears, for example rotary gears, and is especially noticeable when reversing direction. Generally, less expensive assemblies have a larger backlash because a greater tolerance is allowed in the manufacture. However, because of wear during use, in all assemblies the backlash can increase and eventually parts can need repair or replacement. This is especially true in high accuracy assemblies.

Thus, diagnostic equipment and method is disclosed that measures/determines gear assembly characteristics such as drive backlash across the gear mesh, drive lifetime, lubricant properties, etc. The diagnostic apparatus is also capable of determining the wear of a drive assembly and changes at different rates over the life of the unit. To date no diagnostic apparatus capable of providing these features is known.

It would be highly advantageous, therefore, to remedy the foregoing and other deficiencies inherent in the prior art.

Accordingly, it is an object of the present invention to provide a new and improved diagnostic apparatus and method for measuring gear assembly characteristics such as drive backlash across the gear mesh, drive lifetime, lubricant properties, etc.

It is another object of the present invention to provide a new and improved diagnostic apparatus and method for determining the wear of a drive assembly and changes at different rates over the life of the unit.

It is another object of the present invention to provide a new and improved diagnostic apparatus in modular form attached directly to a gear assembly.

SUMMARY OF THE INVENTION

Briefly to achieve the desired objects and advantages of the instant invention in accordance with a preferred embodiment a gear assembly diagnostic system is provided. The gear assembly diagnostic system includes an electric motor attached to a gear assembly to be diagnosed, a motor controller coupled to the electric motor to control electric power applied to the electric motor, a test controller coupled to the motor controller to provide commands to the motor controller, and electrical current determining apparatus coupled to provide determinations of current flow through the electric motor. A programmable data acquisition device is coupled to the electrical current determining apparatus and is programmed to initiate determinations of electrical current flowing through the electric motor at a predetermined frequency. Data storage is coupled to the data acquisition device for receiving and storing current flow determinations from the data acquisition device and a computer is coupled to, and may include, the data storage. The computer includes software designed to calculate one or more characteristics of the gear assembly to be diagnosed from the current flow determinations.

To further achieve the desired objects and advantages of the present invention a specific embodiment of the gear assembly diagnostic system includes an electric motor attached to a gear assembly to be diagnosed, a motor controller coupled to the electric motor to control electric current applied to the electric motor, and a test controller including a programmable computer coupled to the motor controller to provide commands to the motor controller. A diagnostic cycle stored within the programmable computer includes instructions in the form of a program instructing the motor controller to actuate the electric motor for multiple programmable periods of time in selected directions. Electrical current determining apparatus is coupled to provide a measurement of current flow through the electric motor and a programmable data acquisition device is coupled to the electrical current determining apparatus and programmable to initiate determinations of current flow through the electric motor at a predetermined frequency. The predetermined frequency of the determinations of current flow through the electric motor is greater than the number of multiple programmable periods in the diagnostic cycle so that a multiple of determinations is performed for each programmable period. Data storage is coupled to the data acquisition device for receiving and storing current flow determinations from the data acquisition device and a computer is coupled to the data storage and includes software designed to calculate one or more characteristics of the gear assembly to be diagnosed from the current flow determinations.

To further achieve the desired objects and advantages of the present invention a specific method of calculating one or more characteristics of a gear assembly includes the step of providing an electric motor attached to a gear assembly to be diagnosed, a motor controller coupled to the electric motor to control electric current applied to the electric motor; a test controller including a programmable computer coupled to the motor controller, electrical current determining apparatus coupled to provide a measurement of current flow through the electric motor, a programmable data acquisition device coupled to the electrical current determining apparatus, data storage coupled to the data acquisition device, and a computer including software coupled to the data storage. The method further includes the steps of storing a diagnostic cycle within the programmable computer coupled to the motor controller, the diagnostic cycle including instructions in the form of a program instructing the motor controller to actuate the electric motor for multiple programmable periods of time in selected directions, actuating the electric motor in accordance with the stored diagnostic cycle within the programmable computer coupled to the motor controller, programming the data acquisition device to determine electrical current flow through the electric motor at a predetermined frequency using the electrical current determining apparatus, the predetermined frequency of the determinations of electrical current flow being greater than the number of multiple programmable periods in the diagnostic cycle so that a multiple of electrical current determinations is performed for each programmable period, receiving and storing in the data storage, electrical current determinations from the data acquisition device, and calculating one or more characteristics of the gear assembly to be diagnosed from the electrical current determinations using the software included in the computer coupled to the data storage.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Driven gear assemblies have been employed in many and varied applications, and are generally used to transmit power or torque or to change the rotational speed of an output with respect to an input. There are many types of gear assemblies and drives, including slew drives. One particular slew drive of interest is used in solar trackers in which solar panels are rotated slowly throughout the day to point the panels at the sun and thereby achieve maximum sunlight. At the end of a day the panels are generally returned to the original position so they receive the morning sun the next day. Thus, the gear assembly is rotated through a complete cycle (i.e. east to west approximately 180 degrees, and back) each day.

Figure 1:
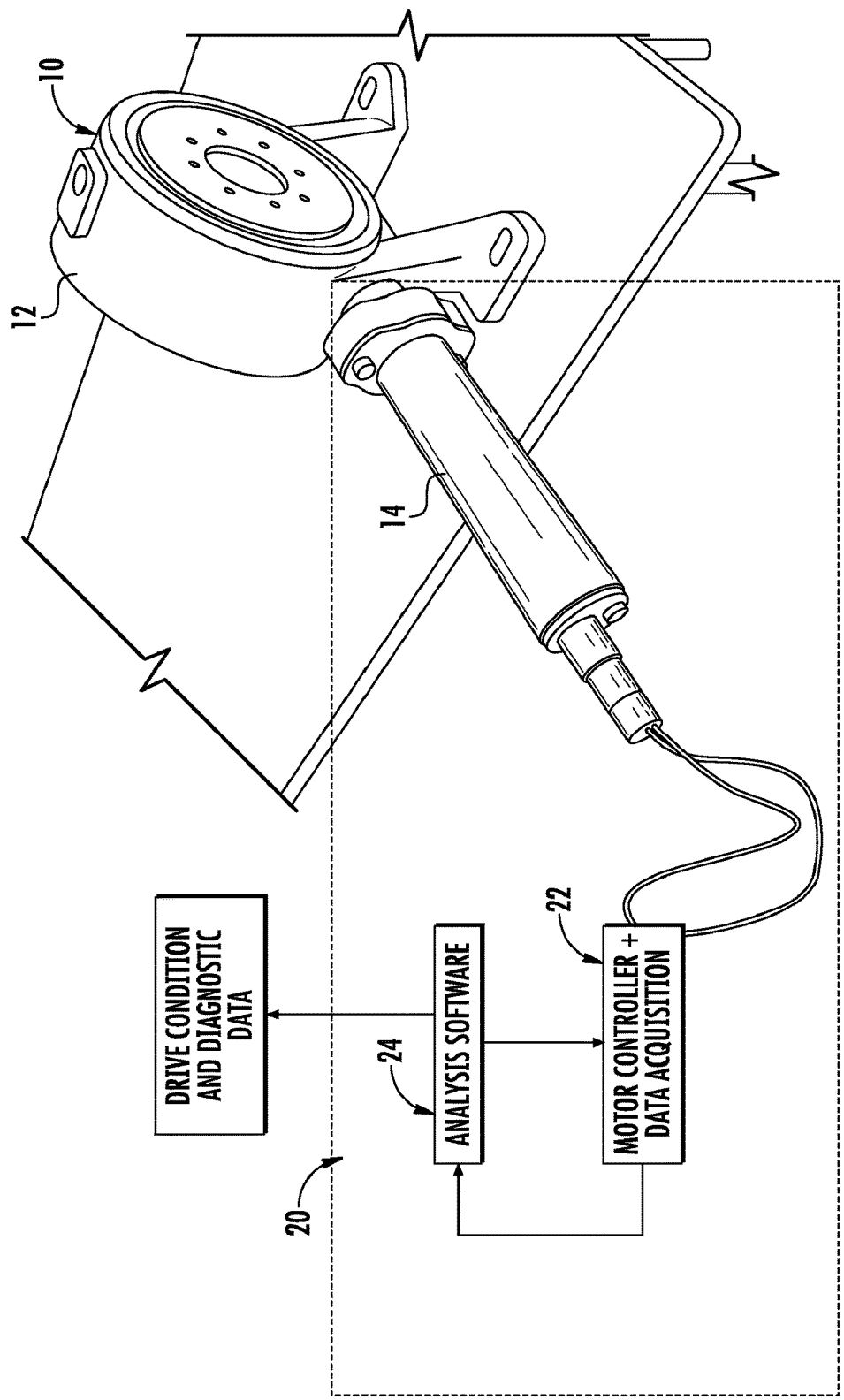
FIG. 1 is a view of a slew drive gearbox and diagnostic system block diagram according to the present invention.

Turning now to the drawings in which like reference characters indicate corresponding elements throughout the several views, attention is directed to FIG. 1 which illustrates a gear assembly 10 coupled to diagnostic system 20, of the present invention. Diagnostic system 20 is illustrated in block form with the blocks indicating separate functions or steps in a diagnostic process. In the preferred embodiment, the gear assembly is a slew drive gearbox 10 coupled to diagnostic system 20. It will be understood that it is possible to test (diagnose) slew drive gearbox 10, or other gear assemblies, while mounted in an apparatus to be slewed or driven, or it can be diagnosed after removal from or before incorporation into the apparatus, as illustrated herein. Slew drive gearbox 10 can be used in a variety of application such as in solar trackers, wind turbines, industrial applications, and the like.

Typically, slew drive gearbox 10 includes a worm and a worm gear (not shown) carried by a housing 12. A motor 14, which may be part of diagnostic system 20 or may be the drive motor for the slew drive in which the slew drive gearbox 10 is employed, rotates the worm to drive the worm gear. Depending on the application, forces involved, input speed, gear materials, environment, and the like, the wear of slew drive gearbox 10 changes at different rates over the life of the unit. Wear to slew drive gearbox 10 can adversely affect the operation of a slew drive unit. Characteristics such as drive backlash across the gear mesh, drive lifetime, lubricant properties, etc. can be analyzed by diagnostic system 20 of the present invention.

Still referring to FIG. 1, system 20 includes motor 14, which can be a separate motor or is the motor used in the slew drive, and a control and data collection assembly 22 coupled to motor 14. Control and data collection assembly 22 operates motor 14 to obtain detailed data points on the functioning of slew drive gearbox 10. The data collected is analyzed by software module 24 to determine backlash and other factors in the drive through analysis of current, voltage, and/or other characteristics of the slew drive.

Figure 2:
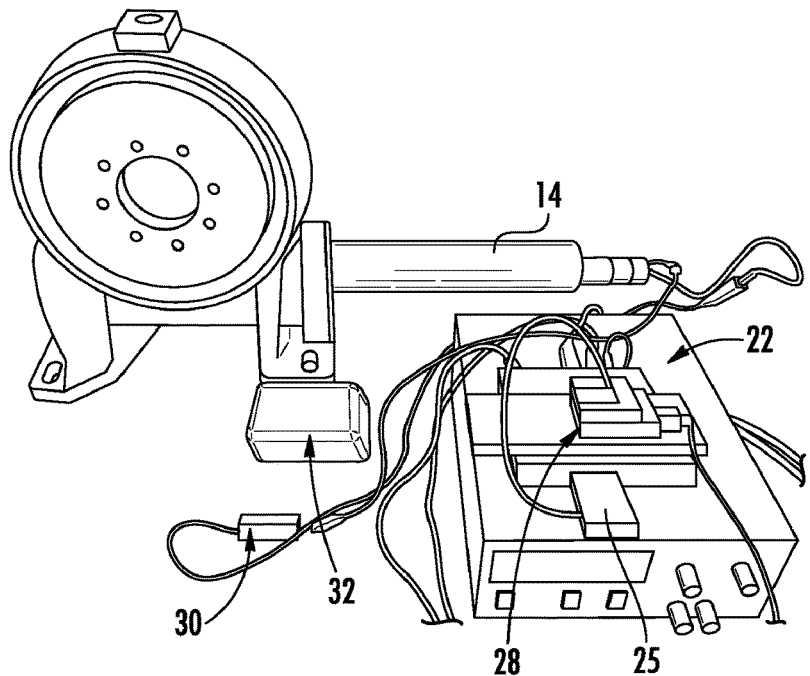
FIG. 2 is a perspective view of a slew drive with a control and data collection assembly coupled thereto.

Turning now to FIG. 2, one embodiment of control and data collection assembly 22 is illustrated being used in system 20. Control and data collection assembly 22 includes a motor controller 25 (such as Roboteq MDC 1230) coupled to motor 14. Motor controller 25 controls the voltage applied to motor 14, in response to commands from a test controller 28. Test controller 28 can be, for example, a small programmable computer, such as an Arduino Uno and the like, although other computing devices can be employed, which is used to command motor controller 25. Current passing from a power supply for motor 14 passes through a shunt 30. In this specific example, shunt 30 provides the ability to measure voltage drop and calculate current in motor 14. Other current determining apparatus and methods, which may measure voltage drop or current flow directly, can be used to provide information/determinations on the electrical current driving the motor and it will be understood that shunt 30 is simply one example. The voltage drop across shunt 30 is measured at high frequency with a data acquisition device 32 (such as DATAQ DI-149) and saved to data storage, such as a computer, via USB and Dataq software or other available means well known to those skilled in the art. Simultaneously, the time intervals at which the motor current is measured are registered. Also, the speed and shaft position of the motor is determined/measured and registered. This determination/measurement can be made in a variety of relatively simple ways/methods, including providing an encoder on the motor shaft connected to feedback position information to the test controller 28, a hall-effect sensor again connected to feedback position information, etc.

As an example of a diagnostic cycle, test controller 28 includes instructions in the form of a program to instruct controller 28 to rapidly move motor 14 back and forth for short distances, about different points during a complete travel path. For example, the worm and worm gear in slew drive gearbox 10 might have a total travel path of 180 degrees. In this example, motor 14 might be moved back-and-forth about several selected points throughout that travel path and simultaneously gradually moved along the entire travel path. Current draw of motor 14 is measured throughout this process and analyzed to draw conclusions as to the physical condition of the gear assembly.

In a specific example of a gear moving process, motor 14 is activated for a period of time, such as 10 seconds, moving slew drive gearbox 10 a prescribed amount in a counter-clockwise direction. Test controller 28 stops motor 14, then actuates motor 14 for a lesser period of time, such as 5 seconds, moving slew drive gearbox 10 a lesser amount in a clockwise direction. Test controller 28 reverses motor 14 again, moving slew drive gearbox 10 in the counter-clockwise direction for 5 seconds. At this point, test controller 28 repeatedly stops and starts motor 14 to move slew drive gearbox 10 in the counter-clockwise direction for 5 second intervals. The repeated intervals of movement continue until the entire gear mesh (travel path) of the slew drive gearbox 10 is measured and backlash zones are defined across the mesh. Backlash is then calculated from analysis of motor currents, using the registered time intervals at which the current measurements/determinations were made and the speed and position of the motor shaft.

Backlash is the distance, also referred to as play between the worm and the teeth of the worm gear. Backlash effects the operation of the slew drive differently depending on the application. Sometimes some backlash is desirable and sometimes less or no backlash is desired, it depends on the application. However, as a slew drive gearbox 10 is used, backlash can increase from wear. It is desirable to be able to determine not only current backlash but wear in slew drive gearbox 10. This is accomplished in the present invention by measuring a baseline backlash using system 20 of the present invention, and then measuring the backlash of a gearbox 10 after a period of use to determine changes therein.

It will be understood that all of the components/functions, including motor controller 25, test controller 28, data acquisition device 32, and shunt 30 could be included in a single programmable computer (e.g. system 20 in FIG. 1) connected to the electrical power terminals of drive motor 14. In the example of a single programmable computer, the computer program performs all of the actuation, current/voltage measurements, data recording, and analysis of the movement, throughout a movement process. Further, in the example of a single programmable computer, the computer is still considered to include all of the listed components/functions so that a gear assembly diagnostic system can be embodied in several interconnected individual components (including a drive motor) or in a single programmable computer and drive motor as long as all of the components/functions are present. Further, since the included components/functions are relatively simple, the entire programmable computer can be included in a small module (e.g. a single chip) which is relatively inexpensive and can be, as an example, permanently attached/connected to operate a gear box that is to be protected/diagnosed.

Figure 3:
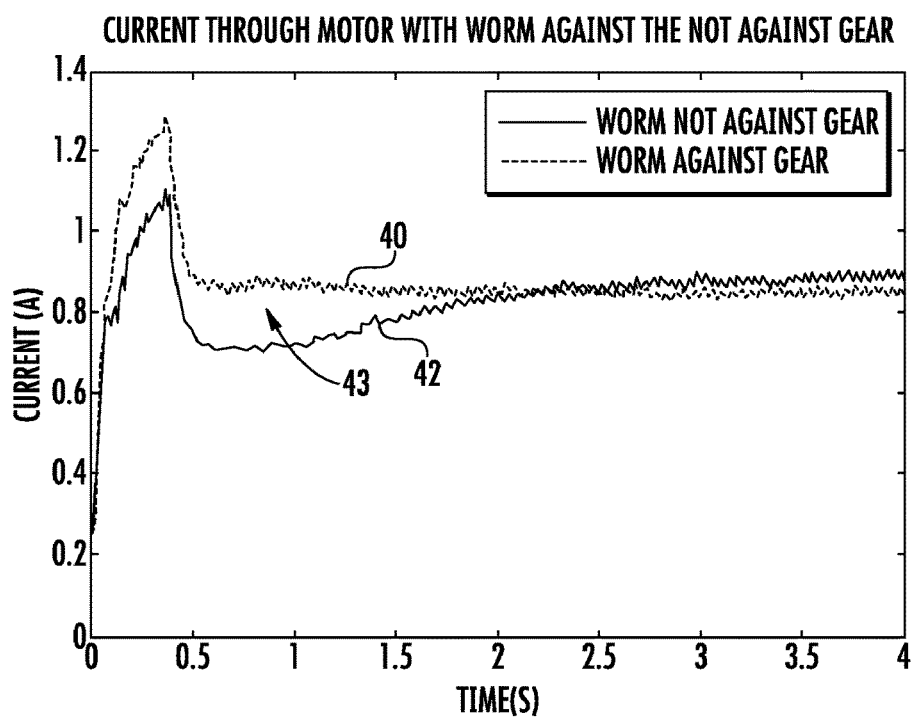
FIG. 3 is graph illustrating current through a motor driving a slew drive gearbox.

Referring to FIG. 3, a graph illustrates current through motor 14 over time with a worm seated against the worm gear, plot 40, and with a worm not seated against the worm gear, plot 42. After measuring the current using system 20, backlash zones 43 can be plotted. By having motor 14 move slew drive gearbox 10 in a first direction, then stopping motor 14 prior to reversing its direction to a second direction, the conditions are set to measure current when the worm is not seated against the worm gear. Moving the slew drive gear in the second direction now gives you plot 42. When the motor is not reversed, but is moved in one direction, stopped and then again moved in the same direction, the worm is seated against the worm gear, providing plot 40. Comparisons of backlash zones can enable determination of wear in slew drive gearbox 10. By using the current determinations and the registered time intervals at which the current measurements/determinations were made and the speed and position of the motor shaft (included in the horizontal axis of FIG. 3), the process is moved from the time domain to the physical domain and backlash is calculated.

Figure 4:
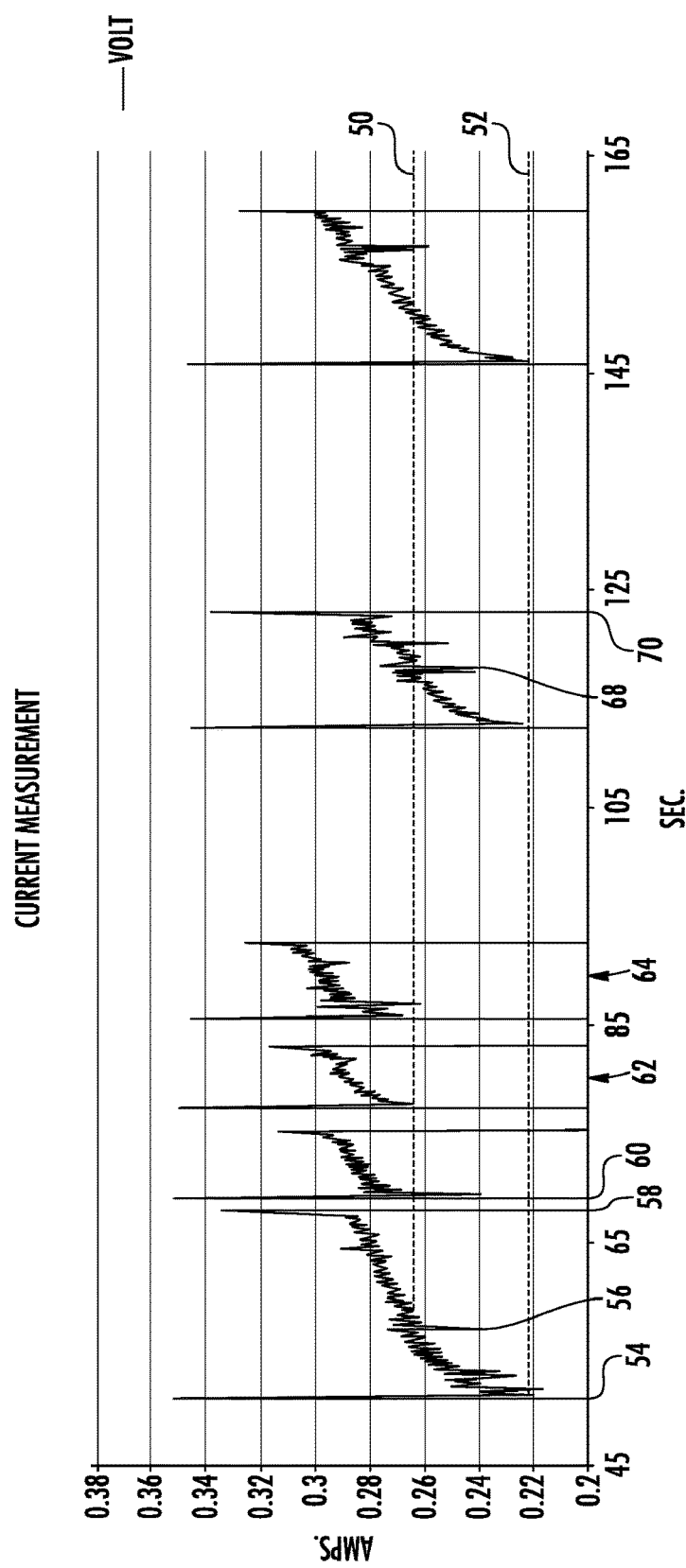
FIG. 4 is a graph illustrating voltage across a current shunt coupled between a motor driving a slew drive gearbox and a power source.

Turning now to FIG. 4, another graph is illustrated, wherein the current through motor 14 is plotted. In FIG. 4, the vertical axis indicates current flowing through motor 14 in amperes and the horizontal axis indicates time in seconds. Further, the long vertical lines indicate the starting and stopping of motor 14. The difference between a worm seated against the worm gear, illustrated by broken line 50, and a worm that is not seated against the worm gear, illustrated by broken line 52, is clear. The backlash zones can quickly be determined in this manner. For example, drive current is applied to motor 14 at first vertical line 54, at which time the worm is not seated against the gear teeth. The initial starting current is on line 52 and gradually increases to the current at line 50. At a point designated 56 the worm becomes seated against the gear teeth. The current continues to gradually increase to a point designated 58, at which time motor 14 is being driven in normal operation, i.e. the worm gear is turning the gear teeth. The relatively light current flowing through motor 14 between line 54 and point 56 is a direct indication of the backlash or backlash zone in motor 14.

In this example, current to motor 14 is stopped at point 58 and then started again at a point 60 to drive motor 14 in the same direction. Since the worm is seated against the gear teeth the current at point 60 starts (almost instantaneously) at line 50. In this example, motor 14 is quickly started and stopped in the same direction two more times, designated by numbers 62 and 64. After a short time lag, at vertical line 66, current is again applied to motor 14 driving motor 14 in the opposite direction. The initial starting current is on line 52 and gradually increases to the current at line 50. At a point designated 68 the worm becomes seated against the gear teeth. The current continues to gradually increase to a point designated 70, at which time motor 14 is being driven in the opposite direction in normal operation, i.e. the worm gear is turning the gear teeth. The relatively light current flowing through motor 14 between line 66 and point 68 is a direct indication of the backlash in motor 14. Once a backlash zone for a particular slew drive gearbox is known, diagnosis of wear and other characteristics can be accomplished.

Here it should be noted that in instances or applications where it is desired to protect or monitor a gear assembly driven by a motor, a small modular computer embodying the components/functions of the present invention is attached directly to the motor/gear assembly. In this instance, the modular computer is programmed to periodically perform some of the diagnostic movements described above and to compare current conditions (e.g. backlash, etc.) to previous measured conditions. In some specific applications, the modular computer can also be programmed to provide warnings as to the condition of the gear assembly.

Thus, new and improved diagnostic apparatus and method for measuring/analyzing gear assembly characteristics such as drive backlash across the gear mesh, drive lifetime, lubricant properties, etc. are disclosed. Also, the new and improved diagnostic apparatus and method can include programs for determining the wear of a drive assembly and changes at different rates over the life of the unit. Further, the new and improved diagnostic apparatus can be provided in modular form attached directly to a gear assembly for additional and continuous protection/analysis.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

The invention claimed is:

1. A gear assembly diagnostic system comprising:
   an electric motor attached to a gear assembly to be diagnosed, the electric motor and attached gear assembly including a drive motor and slew drive gearbox having a worm and a worm gear;
   a motor controller coupled to the electric motor to control electric power applied to the electric motor;
   a programmable test controller coupled to the motor controller and programmable to provide commands to the motor controller to initiate current flow through the electric motor, the programmable test controller includes a programmable computer, a diagnostic cycle stored within the programmable computer includes instructions in the form of a program instructing the motor controller to actuate the electric motor for multiple periods of time in the same and/or opposite directions and for different lengths of time;

electrical current determining apparatus coupled to provide a determination of electrical current flowing through the electric motor;

a programmable data acquisition device coupled to the electrical current determining apparatus and programmed to initiate determinations of electrical current flowing through the electric motor at a predetermined frequency;

data storage coupled to the data acquisition device for receiving and storing current flow determinations from the data acquisition device; and a computer coupled to the data storage and including software designed to calculate one or more characteristics of the gear assembly to be diagnosed from the current flow determinations.

2. The gear assembly diagnostic system as claimed in claim 1 wherein the diagnostic cycle includes a first programmable period of time to drive the electric motor in a first direction, a second programmable period of time to drive the electric motor in a second direction opposite the first direction, the second period of time being shorter than the first period of time, and a third programmable period of time to drive the electric motor in the first direction.

3. The gear assembly diagnostic system as claimed in claim 2 wherein the software included in the computer coupled to the data storage is designed to calculate backlash in the gear assembly from current flow determinations during the diagnostic cycle.

4. The gear assembly diagnostic system as claimed in claim 1 wherein the predetermined frequency of the determinations of electrical current flowing through the electrical current determining apparatus is greater than the number of multiple periods in the diagnostic cycle so that a plurality of current flow determinations is performed for each of the multiple periods.

5. The gear assembly diagnostic system as claimed in claim 1 wherein data storage is included in the computer coupled to the data storage.

6. The gear assembly diagnostic system as claimed in claim 1 wherein the motor controller coupled to the electric motor, the test controller coupled to the motor controller, the electrical current determining apparatus, the programmable data acquisition device coupled to the electrical current determining apparatus, the data storage coupled to the data acquisition device, and the computer coupled to the data storage are all included in one of a single programmable computer or a plurality of individual components.

7. The gear assembly diagnostic system as claimed in claim 1 further including motor speed and a motor shaft position determining/measuring apparatus coupled to the programmable data acquisition device.

8. A gear assembly diagnostic system comprising:

an electric motor attached to a gear assembly to be diagnosed;

a motor controller coupled to the electric motor to control electric current applied to the electric motor;

a test controller including a programmable computer coupled to the motor controller to provide commands to the motor controller, a diagnostic cycle stored within the programmable computer including instructions in the form of a program instructing the motor controller to actuate the electric motor for multiple programmable periods of time in selected directions;

electrical current determining apparatus coupled to provide a determination of current flow through the electric motor;

a programmable data acquisition device coupled to the electrical current determining apparatus and programmable to initiate current flow determinations from the electrical current determining apparatus at a predetermined frequency, the predetermined frequency of the determinations of current flow through the electrical current determining apparatus being greater than the number of multiple programmable periods in the diagnostic cycle so that a multiple of current determinations is performed for each programmable period;

data storage coupled to the data acquisition device for receiving and storing electrical current determinations from the data acquisition device; and a computer coupled to the data storage and including software designed to calculate one or more characteristics of the gear assembly to be diagnosed from the electrical current determinations.

9. The gear assembly diagnostic system as claimed in claim 8 wherein the diagnostic cycle includes a first programmable period of time to drive the electric motor in a first direction, a second programmable period of time to drive the electric motor in a second direction opposite the first direction, the second period of time being shorter than the first period of time, and a third programmable period of time to drive the electric motor in the first direction.

10. The gear assembly diagnostic system as claimed in claim 8 wherein the software included in the computer coupled to the data storage is designed to calculate backlash in the gear assembly from current flow determinations during the diagnostic cycle.

11. The gear assembly diagnostic system as claimed in claim 8 wherein the motor controller coupled to the electric motor, the test controller coupled to the motor controller, the electrical current determining apparatus, the programmable data acquisition device coupled to the electrical current determining apparatus, the data storage coupled to the data acquisition device, and the computer coupled to the data storage are all included in one of a single programmable computer or a plurality of individual components.

12. The gear assembly diagnostic system as claimed in claim 11 wherein the motor controller coupled to the electric motor, the test controller coupled to the motor controller, the electrical current determining apparatus, the programmable data acquisition device coupled to the electrical current determining apparatus, the data storage coupled to the data acquisition device, and the computer coupled to the data storage are all included in a single programmable computer and the dingle programmable computer is in the form of a module attached to the electric motor.

13. The gear assembly diagnostic system as claimed in claim 8 wherein the electrical current determining apparatus includes a shunt connected to the electric motor to receive electric current flowing through the electric motor.

14. The gear assembly diagnostic system as claimed in claim 8 further including motor speed and a motor shaft position determining/measuring apparatus coupled to the programmable data acquisition device.

15. A method of calculating one or more characteristics of a gear assembly comprising the steps of:

providing an electric motor attached to a gear assembly to be diagnosed, a motor controller coupled to the electric motor to control electric power applied to the electric motor; a test controller including a programmable computer coupled to the motor controller, electrical current determining apparatus coupled to provide a determination of current flow through the electric motor, a programmable data acquisition device coupled to the electrical current determining apparatus, data storage coupled to the data acquisition device, and a computer including software coupled to the data storage;

storing a diagnostic cycle within the programmable computer coupled to the motor controller, the diagnostic cycle including instructions in the form of a program instructing the motor controller to actuate the electric motor for multiple programmable periods of time in selected directions;

actuating the electric motor in accordance with the stored diagnostic cycle within the programmable computer coupled to the motor controller;

programming the data acquisition device to determine electrical current flow through the electric motor at a predetermined frequency using the electrical current determining apparatus, the predetermined frequency of the determinations of electrical current flow being greater than the number of multiple programmable periods in the diagnostic cycle so that a multiple of electrical current determinations is performed for each programmable period;

receiving and storing in the data storage, electrical current determinations from the data acquisition device; and calculating one or more characteristics of the gear assembly to be diagnosed from the electrical current determinations using the software included in the computer coupled to the data storage.

16. The method as claimed in claim 15 further including the step of storing a diagnostic cycle within the programmable computer includes the steps of storing a first programmable period of time to drive the electric motor in a first direction, storing a second programmable period of time to drive the electric motor in a second direction opposite the first direction, the second period of time being shorter than the first period of time, and storing a third programmable period of time to drive the electric motor in the first direction.

17. The method as claimed in claim 15 including a step of designing the software included in the computer coupled to the data storage to calculate backlash in the gear assembly from electrical current determinations during the diagnostic cycle.

18. The method as claimed in claim 15 wherein the step of providing the electric motor attached to the gear assembly includes providing a drive motor and slew drive gearbox including a worm and a worm gear.

19. The method as claimed in claim 15 wherein the step of storing a diagnostic cycle within the programmable computer includes the steps of storing a diagnostic cycle within the programmable computer including instructions in the form of a program instructing the motor controller to actuate the electric motor between a first period when the worm is seated against the worm gear and a second period when the worm is not seated against the worm gear and calculating backlash in the gear assembly from comparing electrical current determinations during the first period and the second period.

20. The method as claimed in claim 15 wherein the steps of storing a diagnostic cycle, programming the data acquisition device to determine electrical current through the electric motor, receiving and storing in the voltage drop measurements, and calculating one or more characteristics of the gear assembly to be diagnosed from the electrical current determinations are all performed in a single programmable computer or in a plurality of individual components.

21. The method as claimed in claim 15 wherein the step of providing includes providing motor speed and a motor shaft position determining/measuring apparatus coupled to the programmable data acquisition device.

22. The method as claimed in claim 21 wherein the step of calculating one or more characteristics of the gear assembly to be diagnosed from the electrical current determinations using the software included in the computer coupled to the data storage further includes using the motor speed and shaft position determination/measurement.

* * * * *